United States Patent [19]

Lawassani et al.

[11] Patent Number: 4,982,991
[45] Date of Patent: Jan. 8, 1991

[54] UPHOLSTERED SUN VISOR

[75] Inventors: Abdi R. Lawassani, Pontiac; Mark J. Wasik, Alma, both of Mich.

[73] Assignee: United Technologies Automotive, Inc., Dearborn, Mich.

[21] Appl. No.: 373,858

[22] Filed: Jun. 29, 1989

[51] Int. Cl.⁵ ............................................. B60J 3/00
[52] U.S. Cl. ................................... 296/97.1; 29/91.1
[58] Field of Search ......................... 296/97.1, 97.5; 29/91.1

[56] References Cited

U.S. PATENT DOCUMENTS

| | | | |
|---|---|---|---|
| 2,140,959 | 12/1938 | Jacobs | 296/97.1 |
| 2,901,038 | 8/1959 | Herr et al. | 296/97.1 |
| 3,610,680 | 10/1971 | Brady | 296/97.1 |
| 3,751,106 | 8/1973 | Mahler et al. | 296/97.1 |
| 3,926,470 | 12/1975 | Marcus | 296/97 |
| 4,000,404 | 12/1976 | Marcus | 240/2 |
| 4,068,930 | 1/1978 | Marcus | 350/277 |
| 4,247,850 | 1/1981 | Marcus | 340/694 |
| 4,421,355 | 12/1983 | Marcus | 296/97 |
| 4,458,938 | 7/1984 | Viertel et al. | 296/97 |
| 4,494,789 | 1/1985 | Flowerday | 296/97 |
| 4,521,051 | 1/1985 | Cody et al. | 296/97 |
| 4,570,990 | 2/1986 | Flowerday | 296/97 |
| 4,639,085 | 1/1987 | Marcus et al. | 350/283 |
| 4,648,011 | 3/1987 | Boote et al. | 362/135 |
| 4,763,946 | 8/1988 | Robbins et al. | 296/97.1 |

FOREIGN PATENT DOCUMENTS 90428  4/1988  Japan .................... 296/97.1

Primary Examiner—Robert R. Song

[57] ABSTRACT

A thin, upholstered sun visor (35) comprises a planar core (50) received within an envelope comprising a pair of parallel, semi-rigid panels (60) covered with upholstery material (70). The visor is conveniently assembled by adhesive bonding techniques.

15 Claims, 3 Drawing Sheets

UPHOLSTERED SUN VISOR

TECHNICAL FIELD

This invention relates generally to sun visors for automobiles and the like, and particularly to an auxiliary visor for use in a dual sun visor system.

BACKGROUND ART

Dual sun visor systems typically employ a pair of sun visors to shade the eyes of a vehicle occupant from sun light entering the vehicle through either the windshield or a side window. In such dual sun visor systems, a main (primary) visor is pivotable both vertically and horizontally from a mount usually located above the windshield, at a forward corner of the vehicle ceiling. When an occupant of the vehicle desires to shade his eyes from sunlight entering the vehicle's windshield, he pivots the main visor downwardly (vertically) into a position between his eyes and the windshield. When the relative orientation between the vehicle and the sun causes sunlight to enter the vehicle through a side window, the occupant pivots the main visor horizontally, to a position adjacent the side window, thereby shielding his face from sunlight entering through the side window.

An auxiliary visor is employed to shield the occupant's face from sunlight entering the vehicle's windshield once the primary visor has been horizontally pivoted to a location adjacent the vehicle's side window. Thus, if the relative orientation of the vehicle and the sun changes once again so that direct sunlight enters the vehicle through the windshield, the auxiliary visor may be pivoted downwardly to block the sunlight without having to pivot the primary visor from its position adjacent the side window to its original position adjacent the windshield. When neither of the visors is required to shield an occupant's eyes, the visors are pivoted upwardly adjacent to the vehicle headliner with the auxiliary visor stored between the primary visor and the headliner. Since current primary visors (particularly those employed in luxury vehicles) are rather thick, accommodating accessories therein such as electric lights and vanity mirrors, to compensate for such thickness, it has been the practice to make the auxiliary visors as thin as possible so that when stored positions, the visors collectively will not take up excessive passenger compartment headroom or detract from the vehicle's appearance.

One known scheme for minimizing the thickness of the auxiliary visor for the compact storage thereof, is the construction of the auxiliary visor from a thin panel of unupholstered, plastic material such as polypropolene or the like. The panel is usually color coordinated to the primary visor and may be embossed as well. However, even though color coordinated and embossed, such auxiliary visors have been found to detract from the appearance of the interior of a luxury vehicle. While it is recognized that an auxiliary visor upholstered to match perfectly with an associated primary visor would have much greater aesthetic appeal, current upholstered visor constructions employing a relatively bulky, multi-piece plastic core covered by upholstery material which is clamped between the core pieces, may be suitable for primary visors but are not thin enough for use as auxiliary visors.

DISCLOSURE OF INVENTION

In accordance with the present invention, a thin sun visor particularly adapted for use as an auxiliary visor in a dual visor system, has a structure particularly suitable for the upholstery thereof with a material to match the upholstery of a corresponding primary visor in a dual visor system. The visor comprises a substantially rigid, generally planar core received within an envelope comprising a pair of generally flat parallel panels covered by upholstery material which is folded over the edges of the panels and fixed to edge portions of the inner surfaces thereof. A sheet of fusible adhesive of substantially the same size and shape as the envelope panels and disposed between at least one of the panels and the core, adhesively bonds that panel to the core over the contacting surfaces thereof and to the opposite panel along the contracting inner edge portions of the upholstered panels. In the preferred embodiment, the envelope panels comprise a semi-rigid fiberboard such as cardboard or the like, and are formed integrally with one another, being connected along a hinged joint therebetween, whereby the envelope panels may be folded around the core along the hinge joint.

In a preferred method of manufacturing the visor, the envelope panels are covered with the upholstery material which is attached (as by adhesive bonding) to the inner edge portions of the envelope panels. The core is then inserted in the envelope with the fusible adhesive, and the entire assembly is heated (most conveniently by a dialectric technique) whereby one of the envelope panels is bonded to the core and the opposite panel by the fusible adhesive.

The resulting sun visor, being upholstered to match a corresponding primary visor in a dual sun visor system, is both attractive in appearance yet sufficiently thin for convenient storage against an automobile headliner, behind the primary visor.

BEST MODE OF CARRYING OUT THE INVENTION

Figure 1:
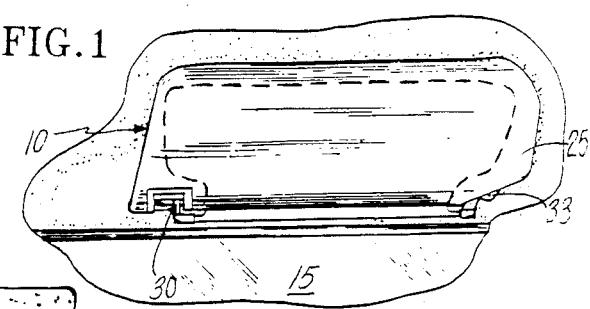
FIG. 1 is an elevation of a dual sun visor system with the visors thereof stored against a vehicle headliner.
Figure 2:
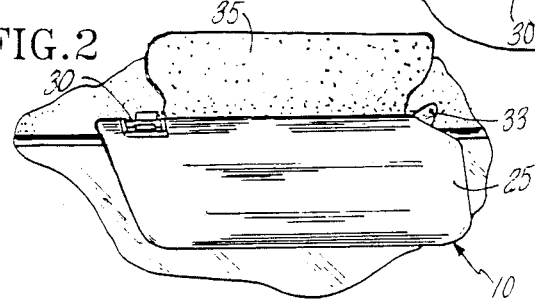
FIG. 2 is a view similar to FIG. 1 but showing a primary visor of the system pivoted downwardly to expose the auxiliary visor.
Figure 3:
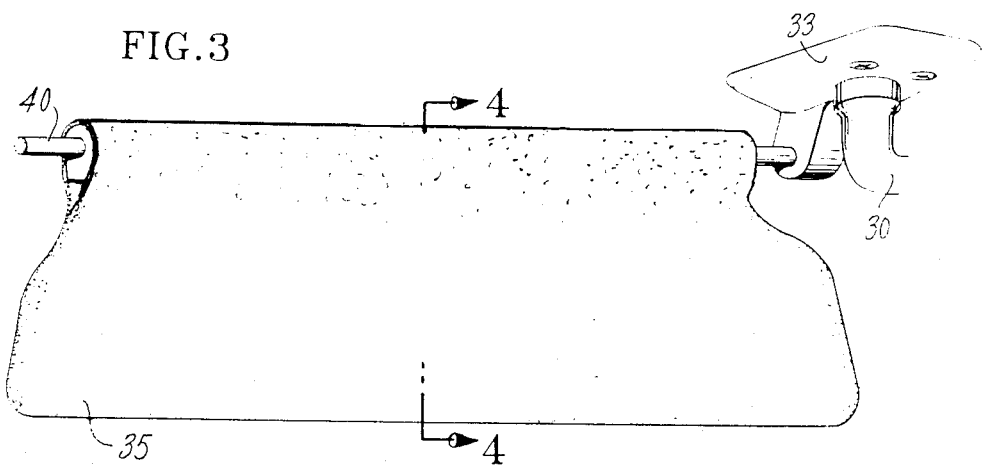
FIG. 3 is a perspective view of the auxiliary visor of FIGS. 1 and 2.

Referring to FIGS. 1 and 2, an automobile dual sun visor system is shown generally at 10, being mounted adjacent to the upper edge of windshield 15 on a vehicle roof covered by headliner 20. The dual visor system comprises a primary visor 25 which is vertically pivotable on rod 30 and horizontally pivotable (with rod 30) from mounting bracket 33, and an auxiliary visor 35 which is vertically pivotable on rod 40 (FIG. 3). Rod 40 is mounted on an extension of bracket 33.

As shown in FIG. 1, the visors are stored against the headliner with the auxiliary visor disposed between the primary visor and the headliner. In the event that an occupant of the automobile desires to shield his or her face from the sun entering the vehicle through the windshield, primary visor 25 is pivoted downwardly to the position shown in FIG. 2. In the event that a subsequent change in relative orientation of the automobile to the sun causes the sun to enter the automobile through a side window thereof, rod 30 may be horizontally rotated about its pivotable connection with mounting bracket 33, leaving secondary visor 35 unobstructed for pivoting downwardly to the position shown in FIG. 3 to shade occupants from sun entering through the windshield.

As set forth hereinabove, the auxiliary visor must be thin enough for compact storage between the primary visor and the automobile headliner, yet attractive enough so as not to detract from the overall appearance of the vehicle's passenger compartment. In accordance with the present invention, auxiliary visor 35 is of a structure which is both very thin for compact storage, yet attractive by way of its upholstered exterior which matches with the primary visor and headliner.

Figure 4:
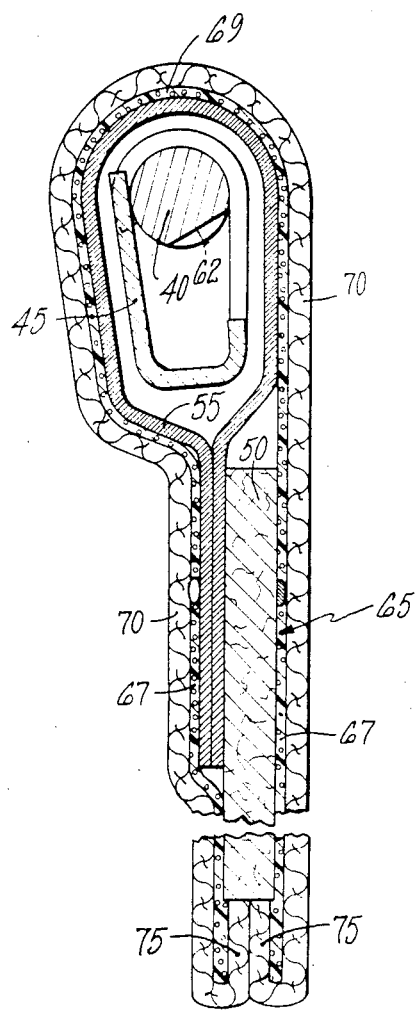
FIG. 4 is a sectional view of the auxiliary visor taken in the direction of line 4—4 of FIG. 3.
Figure 5:
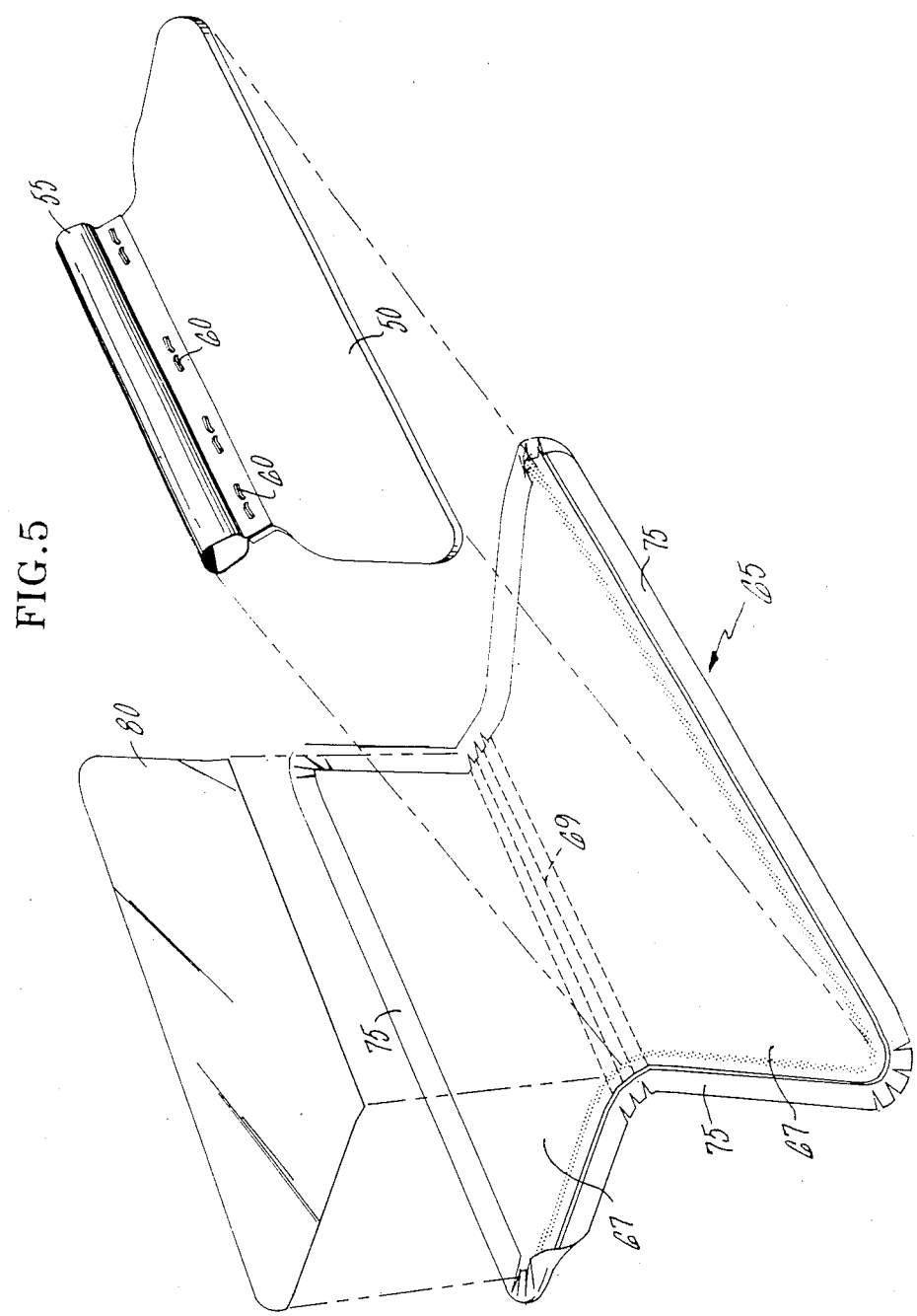
FIG. 5 is an exploded perspective view of the visor.

Referring to FIGS. 4 and 5, the auxiliary visor comprises a rigid core 50 of composition board or the like fastened at the forward edge thereof to a hollow spine (tube) 55 as by staples 60 or the like. Spine 55 accommodates mounting rod 40 therein as well as any suitable hardware such as spring clip 45 (not part of the present invention) which co-operates with flats 62 formed in rod 40 to maintain the visor in its upper, stored position and frictionally hold the visor in any lowered position.

Core 50 is received within a semi-rigid envelope 65 comprising a pair of generally parallel panels 67, each having inner and outer major surfaces in surface-to-surface contact with the major surfaces of the core. The envelope may be formed from any suitable material such as cardboard or the like. Preferably, the panels are integrally formed with one another, being connected along a scored, hinged joint 69. Envelope panels 60 are covered by upholstery material 70 of any suitable variety such as the foam backed, thin fabric upholstery materials currently in use in passenger automobiles. As shown in FIG. 5, upholstery material 70 is proportionately, slightly larger than envelope 55 and includes a skirt portion 75 notched at the corners thereof and folded over the edges of the envelope panels, being adhesively bonded to the interior surfaces of the envelope panels along the edge portions thereof. One or both of the envelope panels are bonded to core 50 by adhesive 80 (FIG. 5) which, as discussed hereinafter may be provided in sheet form.

It will be appreciated that the visor construction set forth hereinabove presents a relatively thin cross-section for compact storage of the visor between the primary visor and the vehicle's headliner. As best seen in FIG. 4, in cross-section, the visor is made up of a relatively thin core, two relatively thin envelope panels, and the upholstery material itself. No relatively bulky plastic core-halves are necessary for rigidity or for clamping the upholstery material therebetween. Thus, the visor herein, while having an appearance as attractive as prior art upholstered visors, is considerably thinner and therefor more conveniently and compactly storable than prior art upholstered visors.

The upholstered sun visor of the present invention is simply and economically manufactured in accordance with the following method. First, the semi-rigid envelope is cut and scored to a shape proportionately, slightly larger than that of the core and the spine. The exterior of the envelope is then covered with upholstery material 70, the skirt portion of which is folded over the edges of the envelope panels and bonded to the inner surfaces of the panels along the edge portions thereof (see FIG. 5). The envelope is then folded over the core and spine with a sheet of fusible adhesive 80 placed between the contacting surfaces of the core and at least one of the envelope panels. Adhesive 80 may comprise a vinyl or similar polymeric material or any other known adhesive and preferably, has a pressure sensitive adhesive on at least one surface thereof whereby the adhesive is tactily bonded to the envelope or core when pressed thereagainst during assembly. Sheet 80, is substantially co-extensive with the upholstered envelope panels. Once the core and adhesive sheet are assembled within the upholstered envelope, the entire assembly is heated (most conveniently by a dielectric heating means) thereby melting adhesive sheet 80 to bond the core to the interior of the envelope and the inner surfaces of the envelope panels together along the edge portions thereof.

It will thus be appreciated that in addition to being compact and attractive, the sun visor of the present invention may be conveniently and economically manufactured by known techniques. A minimum number of components are employed and these components are readily fastened together by known adhesive bonding techniques without requiring extensive manipulation and subassembly processes as are necessary in manufacturing visors with multi-piece plastic cores.

Having thus described the invention, what is claimed is:

1. An upholstered sun visor characterized by:
    a substantially rigid, generally planar core having two opposed major surfaces bounded by an edge portion;
    an envelope, said envelope comprising a pair of generally parallel panels, each having inner and outer surfaces and being bounded by and edge portion, said core being received within said envelope such that said inner panel surfaces are in surface-to-surface contact with said major surfaces of said core; and
    upholstery material, said upholstery material covering said outer surfaces of said envelope panels and including a skirt folded over the edge portions of said envelope panels and disposed between said inner surfaces thereof
    said planar core, envelope and upholstery material being fixed together for maintaining the structural integrity of said sun visor.

2. The upholstered sun visor of claim 1 characterized by:
    said edge portions of said envelope panels being outwardly concentric to said edge portion of said core and;
    said skirt portions of said upholstery material being bonded in surface-to-surface contact with each other.

3. The upholstered sun visor of claim 2 characterized by:
    a sheet of fusible adhesive of substantially the same size and shape as said envelope panels and disposed between at least one of said envelope panels and said core for adhesively bonding said envelope panel to said core over the contacting surfaces thereof and to the other envelope panel along said skirt portion of said upholstery material.

4. The upholstered sun visor of claim 3 characterized by said fusible adhesive comprising a polymeric material.

5. The upholstered sun visor of claim 4 characterized by said polymeric material comprising a vinyl.

6. The upholstered sun visor of claim 1 characterized by said core comprising composition board.

7. The upholstered sun visor of claim 1 characterized by said envelope panels being connected along an elongate hinge joint contiguous to a forward portion of said core edge portion.

8. The upholstered sun visor of claim 7 characterized by said envelope panels and hinge joint being integrally forward from semi-rigid flexible fiber board.

9. A method of manufacturing an upholstered sun visor characterized by:
    providing a substantially rigid, planar core having two opposed major surfaces;
    providing an envelope comprising a pair of generally parallel, thin planar panels;
    providing a sheet of upholstery material;
    covering outer surfaces of said envelope panels with said upholstery material;
    wrapping an edge portion of said upholstery material around the edges of said envelope panels and bonding said edge portions of said upholstery material to the inner surfaces of said envelope panels;
    placing said core within said envelope;
    placing a heat fusible adhesive between at least one of said envelope panels and said core and between opposed edge portions of said inner surfaces of said envelope panels;
    heating said heat fusible adhesive to bond said one envelope panel to said core and to the other envelope panel along an edge portion of the inner surface thereof.

10. The method of claim 9 characterized by said heating said heat fusible adhesive, being effected dielectrically.

11. The method of claim 9 characterized by:
    said envelope panels being formed unitarily from thin, flexible board material and being integrally connected along a hinged joint therebetween;
    said core being placed within said envelope by wrapping said envelope around said core such that said hinged joint overlies a forward edge of said core.

12. The method of claim 9 characterized by said heat fusible adhesive comprising a polymeric material.

13. The method of claim 9 characterized by said heat fusible adhesive being provided in sheet form with a pressure sensitive adhesive on at least one surface thereof, whereby placing said heat fusible adhesive between said one envelope panel and said core tactilely bonds said adhesive to one of said envelope panel and core.

14. The method of claim 9 characterized by said polymeric material comprising a vinyl.

15. The method of claim 9 characterized by said envelope being provided in a shape proportionately larger than that of said core whereby said core does not obstruct the bonding of said opposed edge portions of said inner surfaces of said envelope panels to one another.

* * * * *